United States Patent
Shinohara et al.

(10) Patent No.: US 7,103,665 B2
(45) Date of Patent: Sep. 5, 2006

(54) METHOD OF MANAGING A RESOURCE STORAGE DATA, PROGRAM FOR MANAGING THE RESOURCE STORAGE DATA, STORAGE MEDIA HAVING THE RESOURCE MANAGING PROGRAM, AND RESOURCE MANAGER FOR MANAGING THE RESOURCE STORAGE DATA

(75) Inventors: Daisuke Shinohara, Yokohama (JP); Kenichi Shimooka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 856 days.

(21) Appl. No.: 10/216,746

(22) Filed: Aug. 13, 2002

(65) Prior Publication Data

US 2003/0177239 A1   Sep. 18, 2003

(30) Foreign Application Priority Data

Mar. 15, 2002   (JP)   ............................. 2002-072486

(51) Int. Cl.
*G06F 15/173*   (2006.01)
(52) U.S. Cl. ...................................... 709/226; 709/217
(58) Field of Classification Search ................ 709/200, 709/217, 223, 226, 246, 202, 221, 224, 230, 709/238, 250, 245; 707/2
See application file for complete search history.

(56) References Cited

U.S. PATENT DOCUMENTS

| | | | | | |
|---|---|---|---|---|---|
| 5,732,071 | A | * | 3/1998 | Saito et al. | 370/255 |
| 5,841,991 | A | * | 11/1998 | Russell | 709/221 |
| 5,933,427 | A | * | 8/1999 | Liang | 370/359 |
| 5,949,788 | A | * | 9/1999 | Friedman et al. | 370/431 |
| 6,067,558 | A | * | 5/2000 | Wendt et al. | 709/202 |
| 6,256,676 | B1 | * | 7/2001 | Taylor et al. | 709/246 |
| 6,389,129 | B1 | * | 5/2002 | Cowan | 379/221.03 |
| 6,452,915 | B1 | * | 9/2002 | Jorgensen | 370/338 |
| 6,539,422 | B1 | * | 3/2003 | Hunt et al. | 709/217 |
| 6,539,425 | B1 | * | 3/2003 | Stevens et al. | 709/220 |
| 6,571,286 | B1 | * | 5/2003 | Fisher et al. | 709/224 |
| 6,590,861 | B1 | * | 7/2003 | Vepa et al. | 370/216 |
| 6,591,303 | B1 | * | 7/2003 | Hendel et al. | 709/238 |
| 6,629,145 | B1 | * | 9/2003 | Pham et al. | 709/230 |
| 6,640,251 | B1 | * | 10/2003 | Wiget et al. | 709/238 |
| 6,654,377 | B1 | * | 11/2003 | Pasternak et al. | 370/395.4 |
| 6,654,794 | B1 | * | 11/2003 | French | 709/217 |
| 6,662,221 | B1 | * | 12/2003 | Gonda et al. | 709/223 |
| 6,788,681 | B1 | * | 9/2004 | Hurren et al. | 370/389 |

(Continued)

OTHER PUBLICATIONS

Hybrid modeling for testing intelligent software for lunar-Mars closed life supportMalin, J.T.; Intelligent Processing and Manufacturing of Materials, 1999. IPMM '99. Proceedings of the Second International Conference on vol. 2, Jul. 10-15, 1999 Page(s).*

(Continued)

*Primary Examiner*—Thong Vu
(74) *Attorney, Agent, or Firm*—Mattingly, Stanger, Malur & Brundidge, P.C.

(57) ABSTRACT

A resources managing program is provided on a computer network for converting a resources allocation request issued from a user into a setup request adapting to the type of storage systems that are resources on the network. Computer network interface type information is added to the address of each resources unit of the storage systems and stored as a part of management object information that a resources managing program holds for management. The request received is converted into a setup request adapting to the type of the interface.

16 Claims, 6 Drawing Sheets

U.S. PATENT DOCUMENTS

| | | | |
|---|---|---|---|
| 6,789,126 B1* | 9/2004 | Saulpaugh et al. | 709/245 |
| 6,795,403 B1* | 9/2004 | Gundavelli | 370/256 |
| 6,804,222 B1* | 10/2004 | Lin et al. | 370/338 |
| 6,813,279 B1* | 11/2004 | Trainin | 370/466 |
| 6,877,042 B1* | 4/2005 | Tawil et al. | 709/250 |
| 6,938,059 B1* | 8/2005 | Tamer et al. | 707/205 |
| 2002/0065810 A1* | 5/2002 | Bradley | 707/2 |
| 2002/0069355 A1* | 6/2002 | Garrison | 713/153 |
| 2003/0167329 A1* | 9/2003 | Kurakake et al. | 709/226 |
| 2003/0220987 A1* | 11/2003 | Pearson | 709/220 |
| 2005/0198102 A1* | 9/2005 | Hahn et al. | 709/200 |

OTHER PUBLICATIONS

Distributed data warehouses-the role of adaptive information agents; Clapham, N.T.; Green, D.G.; Kirley, M.; Industrial Electronics Society, 2000. IECON 2000. 26th Annual Confjerence of the IEEE vol. 4, Oct. 22-28, 2000 pp. 2792-2797 vol. 4.*

The Design of a Cryptographic Security Architecture—Peter Gutmann University (1999) ☐☐www.cs.auckland.ac.nz/~pgut001/pubs/usenix99.pdf.*

Wireless Internet Gateways (Wings)—Garcia-Luna-Aceves, Fullmer . . . (1997)☐☐www.cse.ucsc.edu/research/ccrg/publications/chane.milcom97.ps.gz.*

A Modular and Scalable Simulation Tool for Large Wireless . . . —Rajive Bagrodia (1998) ☐☐www.cs.ucla.edu/NRL/wireless/PAPER/tools.ps.gz.*

Design and Implementation of a Virtual Quality of Service MAC—Layer ☐☐ftp.cse.unsw.edu.au/pub/doc/papers/UNSW/0208.pdf.*

A resource query interface for network-aware applications Lowekamp, B.; Miller, N.; Sutherland, D.; Gross, T.; Steenkiste, P.; Subhlok, J.; High Performance Distributed Computing, 1998. Proceedings. The Seventh International Symposium on Jul. 28-31, 1998 pp. 189-196.*

Design and performance of radio access protocols in WATMnet, a prototype wireless ATM network Narasimhan, P.; Biswas, S.K.; Johnston, C.A.; Siracusa, R.J.; Kim, H.; Universal Personal Communications Record, 1997. Conference Record., 1997 IEEE 6th International Conference on vol. 2, Oct. 12-16, 1997 pp. 421-428 vol. 2.*

* cited by examiner

| HOST ID | ADDRESS | OS | HOST GROUP # |
|---|---|---|---|
| HOST 0 | WWN.HA0 | HOS0 | HG#0 |
| HOST 1 | WWN.HA1 | HOS1 | HG#0 |
| HOST 2 | WWN.HA2 | HOS2 | HG#1 |

FIG. 4

| HOST ID | ADDRESS | OS | HOST GROUP # |
|---|---|---|---|
| HOST 0 | MAC.HA0 | HOS0 | HG#0 |
| HOST 1 | MAC.HA1 | HOS1 | HG#0 |
| HOST 2 | MAC.HA2 | HOS2 | HG#1 |

FIG. 5

| HOST ID | ADDRESS | OS | HOST GROUP # |
|---|---|---|---|
| HOST 0 | HA0 | HOS0 | HG#0 |
| HOST 1 | HA1 | HOS1 | HG#0 |
| HOST 2 | HA2 | HOS2 | HG#1 |

FIG. 6

| LV ID | STORAGE SYSTEM # | LV# | ADDRESS | SIZE | LV GROUP # |
|---|---|---|---|---|---|
| LV00 | ST #0 | LV #0 | LVA00 | LVS00 | LVG #0 |
| LV01 | ST #0 | LV #1 | LVA01 | LVS01 | LVG #0 |
| LV10 | ST #1 | LV #0 | LVA10 | LVS10 | LVG #0 |
| LV11 | ST #1 | LV #1 | LVA11 | LVS11 | LVG #1 |

FIG. 7

| HOST GROUP # | LV GROUP # |
|---|---|
| HG #0 | LVG #0 |
| HG #1 | LVG #1 |

FIG. 8

METHOD OF MANAGING A RESOURCE STORAGE DATA, PROGRAM FOR MANAGING THE RESOURCE STORAGE DATA, STORAGE MEDIA HAVING THE RESOURCE MANAGING PROGRAM, AND RESOURCE MANAGER FOR MANAGING THE RESOURCE STORAGE DATA

BACKGROUND OF THE INVENTION

1. Technical Field of the Invention

The present invention relates to managing storage resources on a computer network.

2. Description of the Related Art

For managing storage resources on a computer network, conventionally used addresses locating the storage resources on the network and host computers that use the storage resources have a specific format depending on the type of an interface embodying the network for connecting the host computers and the storage resources. For example, if the interface of the computer network is fiber channels, the address of a host computer is identified by a World Wide Name (WWN) that is unique to the port of the host computer. If the interface is a network running Internet Protocol (IP), the address of a host computer is identified by a Media Access Control (MAC) address that is unique to the network card of the host computer. As an example of prior art of managing such resources using the WWN and MAC addressing, operation of setting a host computer having access rights to a logical volume provided by an on-line storage system will be illustrated below. For example, when a resources manager is allocating a logical volume provided by the storage system to a host computer in connection environment using fiber channels, it sets a port of the storage system for the entry of access requests for the logical volume, gets the WWN of the port of the host computer and the WWN of the above port of the storage system, and registers the mapping between the two WWNs on a switch on the computer network, thus completing the above setting.

Japanese Patent Laid-open No. 2001-249769 describes an on-line storage system whose logical volumes can be mapped to the address of a host computer. The technique described in this publication makes it possible to control access rights to the logical volumes as such by using the WWN of a host computer.

In the foregoing previous techniques for on-line resources management, storage systems and host computers are assigned addresses in a specific format depending on the type of a computer network interface connecting the storage systems and host computers. Therefore, it is necessary to use different address schemes for different types of interfaces. As described in the example of setting a host computer having access rights to a logical volume, some previous technique makes the control of the storage resources themselves possible, whereas some previous technique enables only the control of the entry to the storage resources for access thereto, according to the type of storage systems as the storage resources. Consequently, if different types of storage systems as on-line resources exist on a computer network, users need to take notice of different scopes of management for each type of storage systems to manage the resources of the storage systems. This may complicate the management of the resources particularly when many types of storage systems exist on the network. techniques, the challenges to overcome by the present invention are enabling users to manage on-line resources of storage systems on a computer network, independent of the type of the interface embodying the network and the type of the storage systems even when different types of storage systems exist on the network.

SUMMARY OF THE INVENTION

The present invention is a technique for managing storage resources that has overcome the foregoing challenges and problems.

The present invention essentially provides a resources managing program on a computer network having a plurality of storage systems of different types so that the program converts a resources allocation request received across the network into a setup request adapting to the type of the network or the storage systems. Specifically, in one aspect, the invention provides (1) a method for managing resources of storage systems on a network including the step of converting a resources allocation request received across the network into a setup request adapting to the type of the network or the storage systems under the control of a resources managing program, thereby providing compatibility of different modes of addressing the resources according to the type of the network and/or different modes of accessing the resources according to the type of the storage systems. (2) In the foregoing method of (1), if the resources allocation request designates an asset on an Internet Protocol (IP) network, the above step converts it into a setup request including the Media access Control (MAC) address of the asset as an Application Programming Interface (API) parameter; or if the resources allocation request designates an asset on a fiber channel, the above step converts it into a setup request including the World Wide Name (WWN) of the asset as an API parameter. (3) In the foregoing method of (1), the above step includes the step of, under the control of the resources managing program, registering the following entries into a table: for each unit of the resources of the storage systems, its identifier on the networks its address which adapts to the type of the network, and a group identifier which is assigned by grouping the resources into allocation units. The above step further includes the step of allocating resources units making up a group in a lump, according to the group identifier. (4) In the foregoing method of (1), the above step further includes the steps of registering identification and related information for host computers on the network, mapping a host computer or a group of host computers with a group identifier to a resources unit or a group of resources units of the storage systems, and setting the host computer or the group of host computers permitted to access the resources unit or the group of resources units of the storage systems. (5) In the foregoing method of (1), the above step further includes the step of setting information that each host computer has access rights to which resources units of the storage systems on the network equipment or the storage systems. This information is used by the resources managing program as management information. (6) In the foregoing method of (1), the above step further includes the steps of comparing information that each host computer has access rights to which resources units of the storage systems, set on the storage systems or the network equipment, with the management information held by the resources managing program, and changing discrepancy, if exists, to the setting in accordance with the management information held by the resources managing program. (7) In the foregoing method of (1), the above step further includes the steps of, when a program other than the resources managing program changes the setting on the storage systems or the network equipment, receiving notification of setting change from the storage systems or the network equipment, comparing the setting change with the management information held by the resources managing program, and changing discrepancy, if exists, to the setting in accordance with the management information held by the resources managing program. (8) In the foregoing method of (1), the above step further includes the steps of, under the control of the resources managing program, adding network interface type information to the address of each host computer to which the resources of the storage systems are allocable and storing the network interface type information as a part of management object information that the resources managing program holds for management, wherein the above step converts the received resources allocation request into a setup request adapting to the type of the interface. In another aspect, the invention provides (9) a computer program for managing resources of storage systems on a network, the computer program comprising computer readable program code means causing a computer to perform the step of converting a resources allocation request received across the network into a setup request for network equipment that exerts control of the network or the storage systems so that the setup request adapts to the type of the network or the storage systems, thereby providing compatibility of different modes of addressing the resources according to the type of the network and/or different modes of accessing the resources according to the type of the storage systems. (10) In the foregoing computer program of (9), if the resources allocation request designates an asset on an IP network, the above step converts it into a setup request including the MAC address of the asset as an API parameter; or if the resources allocation request designates an asset on a fiber channel, the above step converts it into a setup request including the WWN of the asset as an API parameter. (11) In the foregoing computer program of (9), the above step includes the step of registering the following entries into a table: for each unit of the resources of the storage systems, its identifier on the network, its address which adapts to the type of the network, and a group identifier which is assigned by grouping the resources into allocation units. The above step further includes the step of allocating resources units making up a group in a lump, according to the group identifier. (12) In the foregoing computer program of (9), the above step further includes the steps of registering identification and related information for host computers on the network, mapping a host computer or a group of host computers with a group identifier to a resources unit or a group of resources units of the storage systems, and setting the host computer or the group of host computers permitted to access the resources unit or the group of resources units of the storage systems. (13) In the foregoing computer program of (9), the above step further includes the step of setting information that each host computer has access rights to which resources units of the storage systems on the network equipment or the storage systems. This information is used by the computer program as management information. (14) In the foregoing computer program of (9), the above step further includes the steps of comparing information that each host computer has access rights to which resources units of the storage systems, set on the storage systems or the network equipment, with the management information held by the computer program, and changing discrepancy, if exists, to the setting in accordance with the management information held by the computer program. (15) In the foregoing computer program of (9), the above step further includes the steps of, when another program changes the setting on the storage systems or the network equipment, receiving notification of setting change from the storage systems or the network equipment, comparing the setting change with the management information held by the computer program, and changing discrepancy, if exists, to the setting in accordance with the management information held by the computer program. (16) The foregoing computer program of (9) is stored into a dedicated hardware chip or a nonvolatile memory as firmware included in the storage systems or the network equipment. In a further aspect, the invention provides (17) a computer readable medium having a computer program for managing resources of storage systems on a network stored thereon. The computer program causes a computer to perform the step of converting a resources allocation request received across the network into a setup request for network equipment that exerts control of the network or the storage systems so that the setup request adapts to the type of the network or the storage systems, thereby providing compatibility of different modes of addressing the resources according to the type of the network and/or different modes of accessing the resources according to the type of the storage systems. In a still further aspect, the invention provides (18) an apparatus for managing storage resources on a network, comprising means for receiving a resources allocation request across the network, means for converting the received resources allocation request into a setup request for network equipment that exerts control of the network or the storage entity under the control of a resources managing program so that the setup request adapts to the type of the network or the storage entity of the storage resources, thereby providing compatibility of different modes of addressing the resources according to the type of the network and/or different modes of accessing the resources according to the type of the storage entity, and means for sending the setup request to the network equipment or the storage entity across the network.

According to the foregoing, even if different type of storage systems exist on a computer system, the resources of the storage systems can be allocated and managed by a common host-to-LV mapping scheme.

DETAILED DESCRIPTION OF THE PREFERRED EMBODIMENTS

The present invention now is described fully hereinafter with reference to the accompanying drawings, in which preferred embodiments of the invention are shown.

Figure 1:
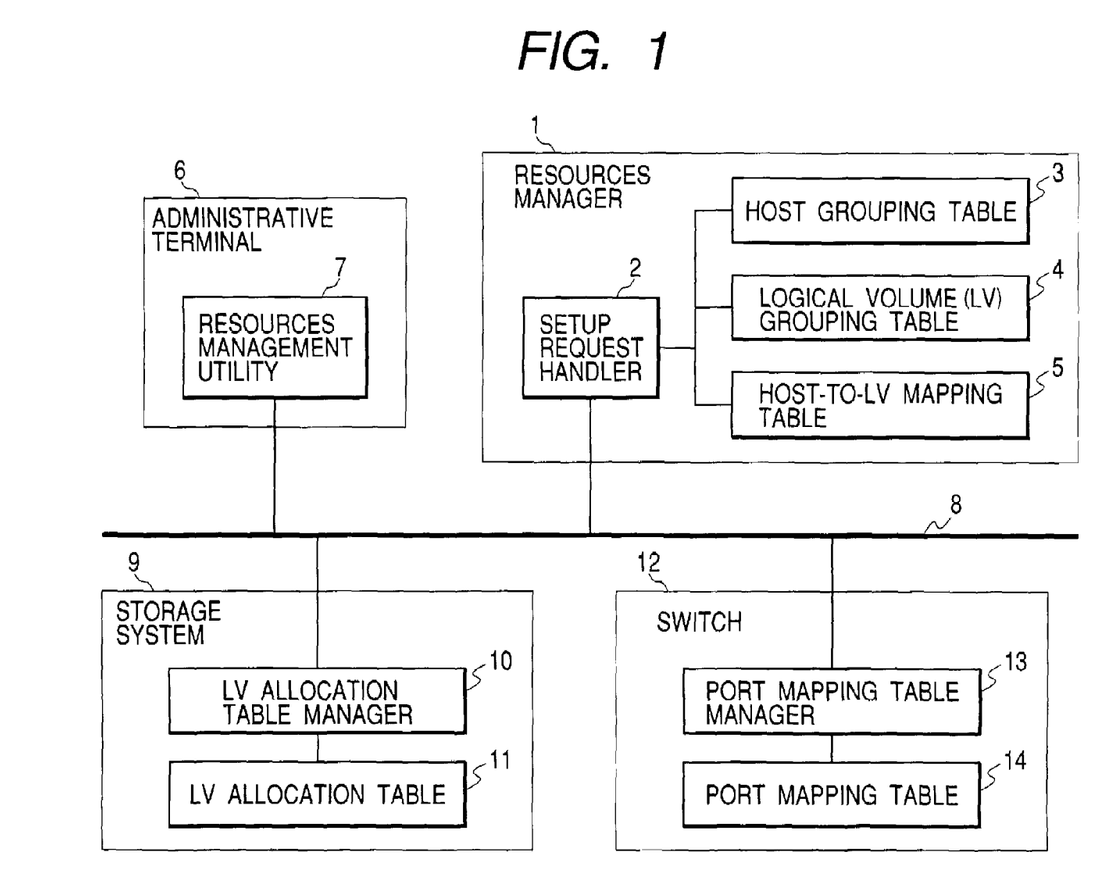
FIG. 1 is a diagram illustrating an example of a computer network system configured for managing logical volumes on on-line storage.

FIG. 1 is a diagram illustrating an example of a computer network system configured for managing logical volumes on on-line storage as storage resources.

In FIG. 1, a block identified by reference number 1 is a resources manager as a resources managing program for managing the resources of on-line storage; a block identified by reference number 6 is an administrative terminal from which directives are sent to the resource manager 1; a block identified by reference number 9 is a storage system in which storage resources to be managed exist; a block identified by reference number 12 is a switch; and a line identified by reference number 8 is an interface for physically connecting the above entities. Through the interface, the resources manager 1 manages the storage system 9 and the switch 12, for example, remotely updating the setup information for the storage system 9 and the switch 12. The resource manager 1 comprises a setup request handler 2 which executes resources management of the storage system 9 in response to a request from the higher-level device, a host grouping table 3 in which respective information for host computers that use the storage system is stored, a logical volume (LV) grouping table 4 in which respective information for logical volumes (hereinafter referred to as LVs) as the resources provided by the storage system 9 is stored, and a host-to-LV mapping table 5 in which mapping between the host computers and the LVs accessible to the host computers is stored. The administrative terminal 6 presents a Graphical User Interface (GUI) window to the user and is provided with a resources management utility 7 for accepting a setup request and displaying results of the requested setup execution on the GUI window. The storage system 9 is furnished with an LV allocation table 11 that is a list of the LVs provided by it and the access-permitted host computers associated with the LVs and an LV allocation table manager 10 which updates the contents of the LV allocation table in response to a request from the higher-level device. The switch 12 is furnished with a port mapping table 14 which is referenced in determining what host computer and what storage system belong to a virtual computer network when a computer network comprising a plurality host computers and a plurality of storage systems is divided into a plurality of virtually independent computer networks, according to the information on the assignments of the ports to the host computers and the storage systems. In addition, the switch 12 includes a port mapping table manager which updates the contents of the port mapping table 14 in response to a request from the higher-level device.

In the thus configured system, the administrative terminal user performs setup operation via the GUI window provided by the resources management utility 7. This enables the user to map a host computer to an LV provided by the storage system in a manner that the operation of the LV allocation table manager 10 of the storage 9 and the port mapping table manager of the switch 12 is transparent to the user and easily if there are different types of storage systems.

FIGS. 2 through 7 are provided to explain mapping between host computers and LVs.

Figure 2:
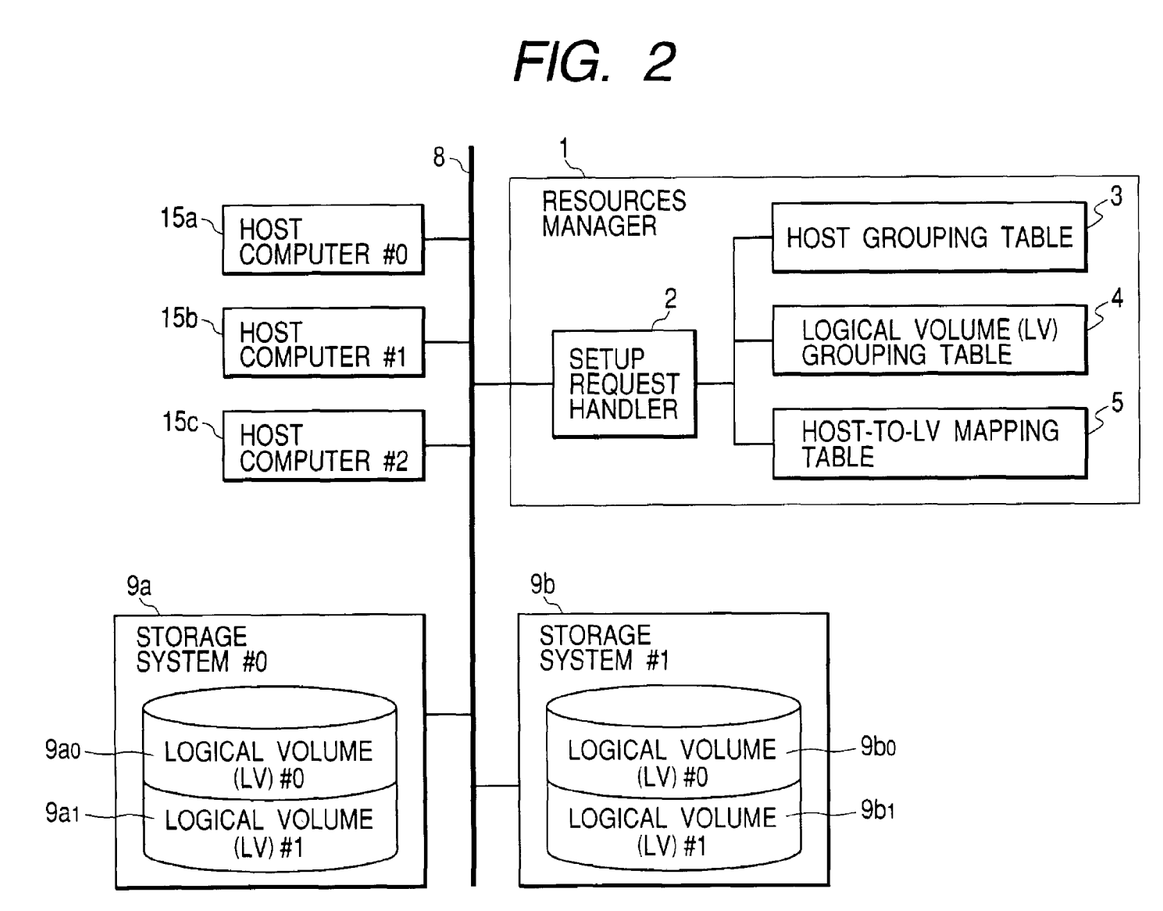
FIG. 2 is a diagram illustrating an example of a computer network configuration in which a plurality of host computers shares storage systems.

FIG. 2 illustrates an example of a computer network configuration in which storage systems are shared by a plurality of host computers.

In FIG. 2, blocks identified by reference numbers 15a, 15b, and 15c respectively are host computers; blocks identified by reference numbers 9a and 9b respectively are storage systems; entities identified by reference numbers $9a_0$ and $9a_1$ respectively are LVs as storage resources provided by the storage system 9a; and entities identified by reference numbers $9b_0$ and $9b_1$ respectively are LVs as storage resources provided by the storage system 9b. The resources manager 1 is the same as shown in FIG. 1. Using a case where two host computers 15a and 15b are set having access rights to three LVs $9a_0$, $9a_1$, and $9b_0$ and one host computer 15c is set having access rights to one LV $9b_1$ as an example, how to set mapping between the host computers and the LVs will be explained hereinafter. In the present configuration, to define mapping between a plurality of the above host computers and a plurality of the LVs, first group the host computers and the LVs.

Figure 3:
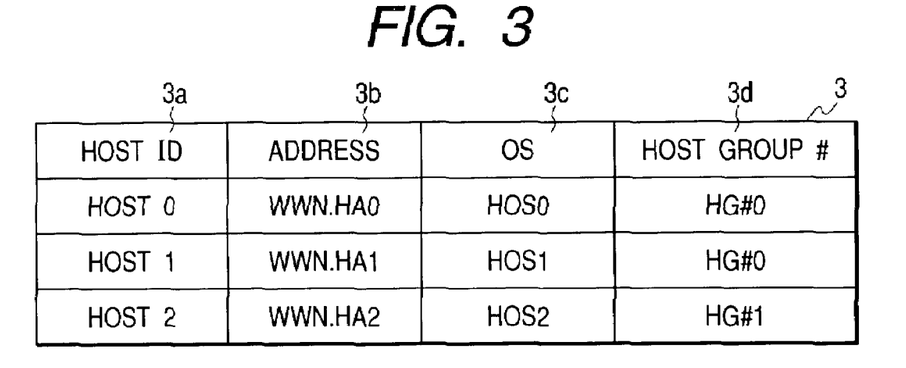
FIG. 3 illustrates an example of contents of a host grouping table if the connection interface is fiber channels.

FIG. 3 illustrates an example of contents of the host grouping table 3 included in FIG. 2; that is, the contents are set as the result of grouping the host computers. The host grouping table 3 contains entries that are set under management in the following columns: host identifier (ID) 3a, address 3b, and OS 3c, which are information specific to a host computer, and host group number (host group #) 3d which is information for grouping the host computers. The host identifier 3a is a user-defined character string to identify a host computer. The address 3b is information to identify a host computer on the network and the address identifier to be assigned to the host computer differs, according to the type of the interface connecting the host computers and the storage systems. For example, if the interface is fiber channels, Host Bus Adapter (HBA) ports are physical connections of the host computers to the fiber channels and the WWNs of the ports are assigned for the host address information on the network. The table contents shown in FIG. 3 are illustrative of the settings in the case where the fiber channels are used. For address "WWN.HA0" in the address 3b column, the "WWN" part indicates the address type WWN and an actual WWN value is assigned to the "HA0" part. The host group number (host group #) 3d indicates a host group to which a host computer belongs. Host computers having the same host group number are grouped.

Figure 4:
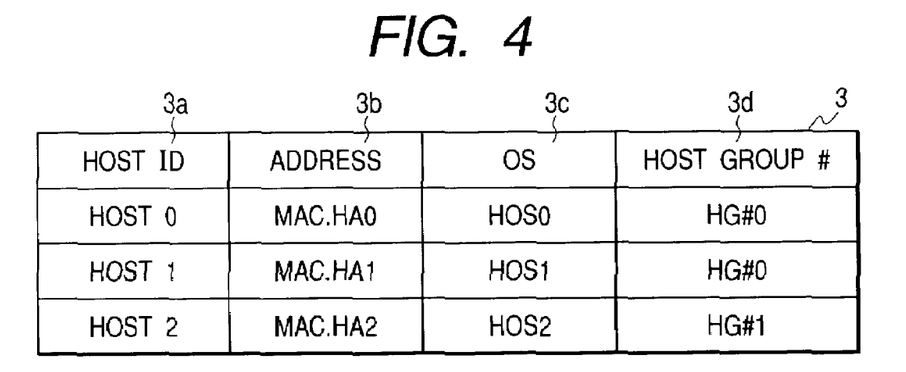
FIG. 4 illustrates another example of contents of the host grouping table if the connection interface is an IP network.

FIG. 4 illustrates another example of contents of the host grouping table as the result of grouping the host computers if the host computers and the storage systems are connected by an Internet Protocol (IP) network. Difference from the table contents shown in FIG. 3 is the contents in the address 3b column. If the connection is made via the IP network, network cards are physical connections of the host computers to the IP network and Media Access Control (MAC) addresses are assigned for host address information on the network. For address "MAC.HA0" in the address 3b column, the "MAC" part indicates the address type MAC and an actual MAC address value is assigned to the "HA0" part.

Figure 5:
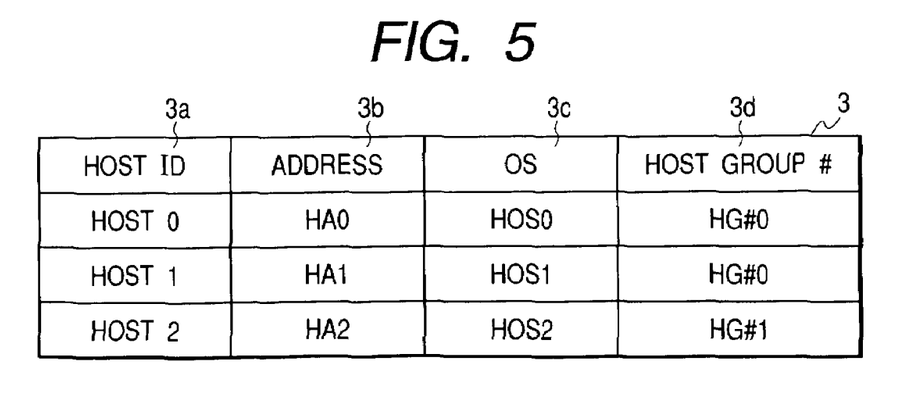
FIG. 5 illustrates a further example of contents of the host grouping table in a form independent of the connection interface.

FIG. 5 illustrates a further example of contents of the host grouping table in which the addresses in the address 3b column are described in a form independent of the type of the interface connecting the host computers and the storage systems. In the address 3b column of the table shown in FIG. 5, generic address expression "HA" represents the address of a host computer. In actuality, however, a specific address value and address type in combination are stored in the address column fields, according to the type of the connection interface.

Figure 6:
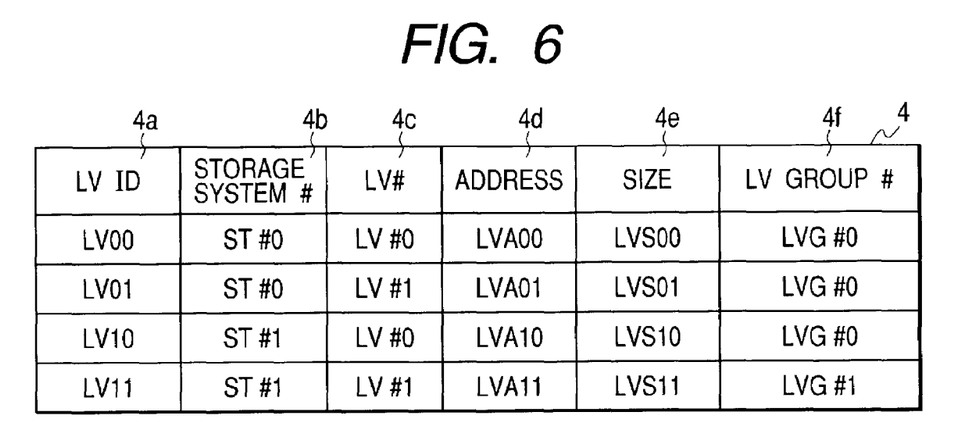
FIG. 6 illustrates an example of contents of a logical volume (LV) grouping table in a form independent of the connection interface.

FIG. 6 illustrates an example of contents of the LV grouping table 4 included in FIG. 2; that is, the contents are set as the result of grouping the LVs. The LV grouping table 4 shown in FIG. 6 contains entries that are set under management in the following columns: LV identifier (ID) 4a, storage system number 4b, LV number (LV#) 4c, address 4d, and size 4e, which are information specific to an LV, and LV group number (LV group #) 4f which is information for grouping the LVs. The LV identifier 4a is a user-defined character string to identify an LV and associated with a storage system number 4b that has the LV identified by it and an LV number 4C to identify the LV within the storage system. The address 4d is information to uniquely identify the LV on the network. As described for the addresses of the above host computers set in the address 3b column, address information to be stored in the address column fields differs, according to the type of the interface to which the storage system is connected. If the storage system is connected to fiber channels, the WWN of the storage system's port and higher-level interface identifying information are assigned in combination. For example, if a Small Computer System Interface (SCSI) is used as the higher-level interface, identification information prescribed for the interface, that is, SCSI ID and Logical Unit Number (LUN) are added to the WWN to identify the LV. If the storage system is connected to the IP network, the MAC address of the network card of the storage system and the higher-level interface identifying information such as SCSI are assigned in combination. The LV group number (LV group #) 4f indicates an LV group to which an LV belongs. LVs having the same LV group number are grouped.

Figure 7:
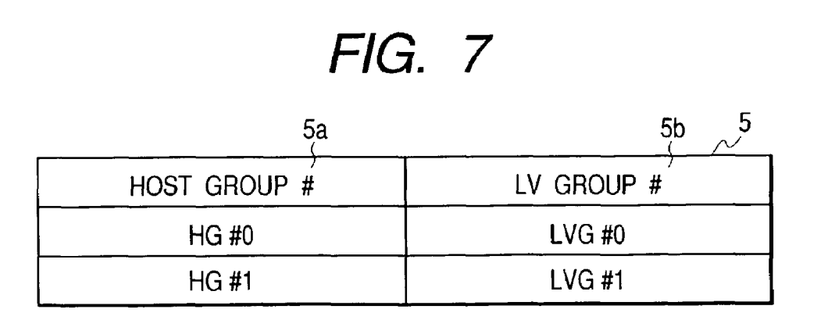
FIG. 7 illustrates an example of contents of a host-to-LV mapping table.

FIG. 7 illustrates an example of contents of the host-to-LV mapping table 5 included in FIG. 2.

The host-to-LV mapping table 5 shown in FIG. 7 maps a host group number (host group #) 3d (5a) from the host grouping table 3 to an LV group number (LV group #) 4f (5b) from the LV grouping table 4. The mapping of a host group to an LV group in the host-to-LV mapping table 5 means that the host computers making up the host group are permitted to access the LVs making up the LV group.

How to operate the resources management utility 7 on the administrative terminal 6 shown in FIG. 1 will be explained below.

Figure 8:
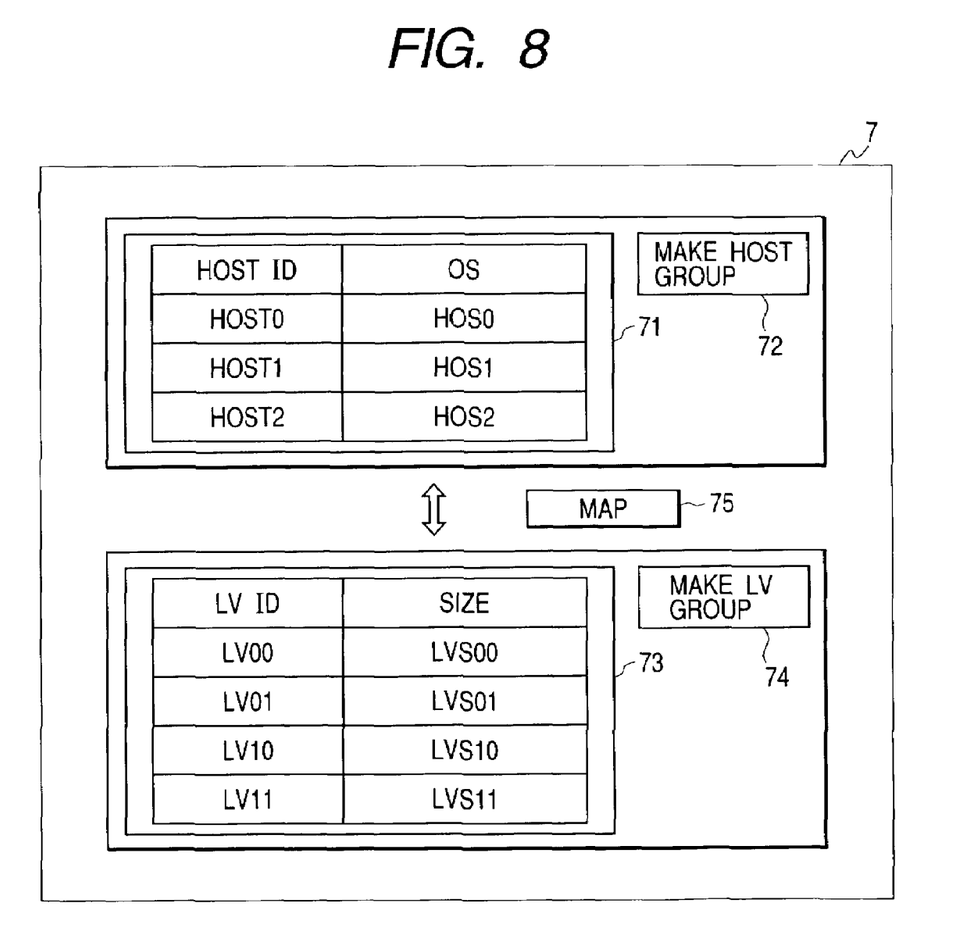
FIG. 8 illustrates an example of a window presented by a resources management utility.

FIG. 8 illustrates an example of a window of the resources management utility 7 included in FIG. 1. The resources management utility 7 provides means for grouping host computers, means for grouping LVs, and means for mapping a host group to an LV group. The window of the resources management utility 7 includes a host list 71 listing the host computers on the network, a "make host group" button 72 for making a new host group, an LV list 73 listing the LVs on the network, a "make LV group" button 74 for making a new LV group, and a "map" button 75 for mapping a host group to an LV group. Assume that the window shown in FIG. 8 have entries as exemplified in the host and LV lists immediately after activating the resources management utility 7. To group host computers, first select host computers to make up a group from the host list 71. The selected state of a host computer is clearly distinguished in appearance by difference in the background color between the line of the selected one and other lines or specially provided flags and the like. After selecting the host computers to make up a group, by clicking the "make host group" button 72, the selected host computers are grouped. To group LVs, select LVs to make up a group from the LV list 73 in the same way as for grouping host computers, and click or press the "make LV group" button 74, then grouping the LVs is completed. After the completion of grouping the host computers and grouping the LVs, click the map button 75, then mapping the host group to the LV group is executed. When the map button 75 is clicked, the information for the host computers making up the host group and the information for the LVs making up the LV group are sent to the resources manager.

Figure 9:
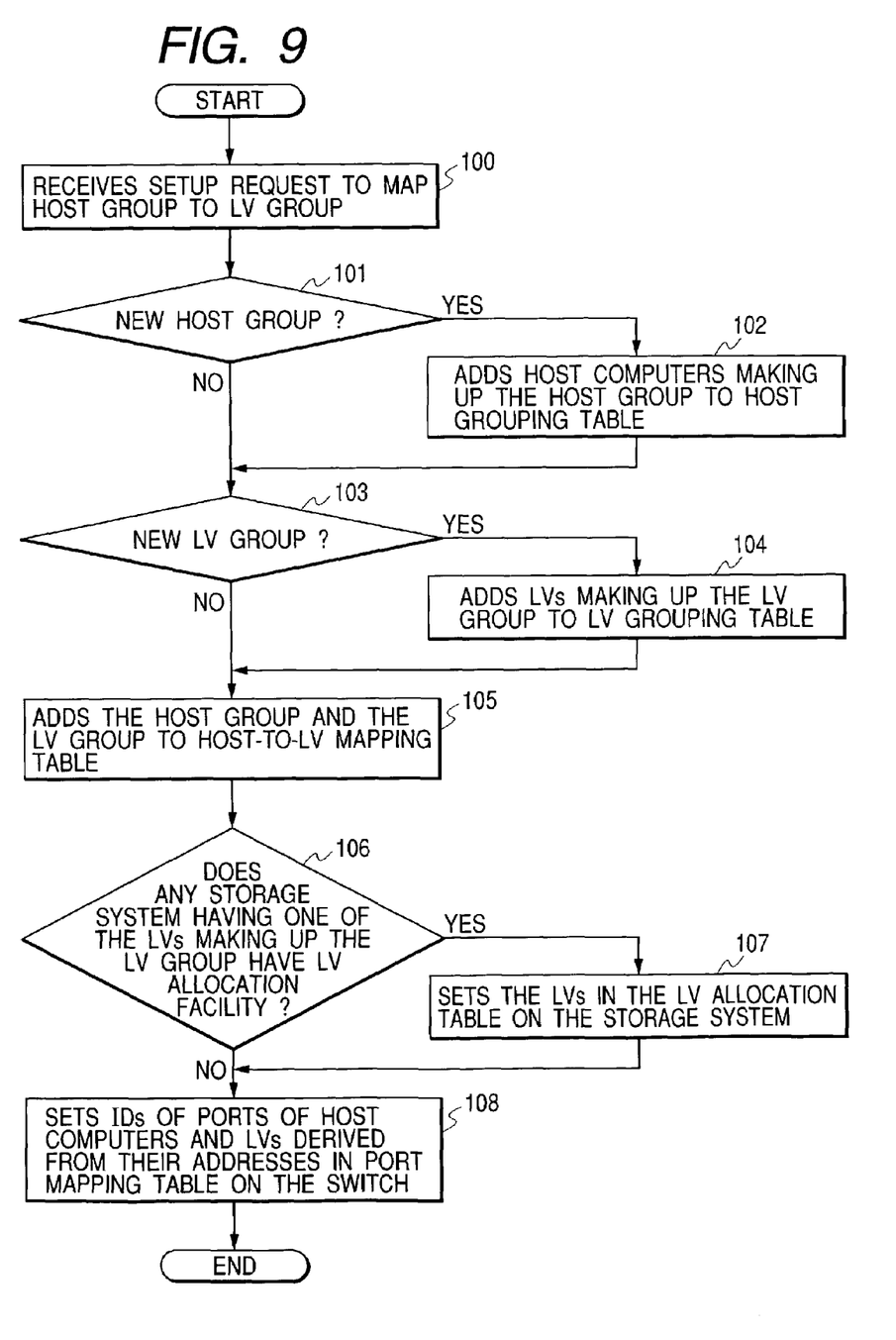
FIG. 9 is a flowchart illustrating an example of a procedure executed by a resource manager.

Using FIG. 1 and FIG. 9, a procedure will be described below in which the setup request handler 2 of the resource manager 1 shown in FIG. 1 receives the information for the host computers making up a host group and the information for the LVs making up an LV group and completes access rights related settings on the storage system 9 and the switch 12.

(1) Step 100

To fulfill a user request to map a host group to an LV group, the resources management utility 7 sends the resources manager 1 a setup request to map the host group to the LV group with the information for the host computers making up the host group and the information for the LVs making up the LV group. The setup request handler 2 of the resources manager 1 receives the setup request to map the host group to the LV group.

(2) Step 101

The setup request handler 2 determines whether the information for the host computers making up the host group, included in the received request, is new host group information not registered in the host grouping table 3.

(3) Step 102

If the information for the host computers making up the host group is new host group information, the setup request handler 2 adds that information to the host grouping table 3.

(4) Step 103

The setup request handler 2 determines whether the information for the LVs making up the LV group, included in the received request, is new LV group information not registered in the LV grouping table 4.

(5) Step 104

If the information for the LVs making up the LV group is new LV group information, the setup request handler 2 adds that information to the LV grouping table 4.

(6) Step 105

The setup request handler 2 adds the host group and the LV group to the host-to-LV mapping table.

(7) Step 106

The setup request handler 2 determines whether one of the storage systems having at least one of the LVs making up the LV group has an LV allocation facility.

(8) Step 107

If one of the above storage systems has the LV allocation facility, that is, the storage system is furnished with the LV allocation table and the LV allocation table manager 10, the setup request handler 2 sends a request to set the LVs to the LV allocation table manager 10 of the storage system.

(9) Step 108

The setup request handler 2 derives the information to identify the ports of the host computers from the addresses of the host computers making up the host group and the information to identify the ports of the storage systems that provide the LVs from the addresses of the LVs making up the LV group.

The setup request handler 2 sends a request to set the host computer ports and storage system ports to the port mapping table manager of the switch 12. Then, the port mapping table 14 is updated so that I/O requests sent from the host computers through their ports are permitted to access the LVs through the ports of the storage systems that provide the LVs.

According to the above-described embodiment, on-line storage resources, that is, a plurality of types of storage systems existing on a computer network can be allocated and managed by a common host-to-LV mapping scheme using grouping, which makes the type of the interface embodying the computer network and the type of the storage systems transparent to users that requests host-to-LV mapping.

According to the present invention, even if different type of storage systems exist on a computer system, the resources of the storage systems can be allocated and managed by the common host-to-LV mapping scheme.

While the preferred embodiment of the present invention was described hereinbefore, the invention may be embodied in other specific forms without departing from its spirit or essential characteristics. Therefore, the described embodiment is to be considered in all respects only as illustrated and not restrictive. The scope of the invention is indicated by the appended claims. All modifications and changes which come within the meaning and range of equivalency of the claims are to be embraced within the scope of the invention.

What is claimed is:

1. A method for managing resources of storage systems on a network, said method comprising:
    a first step of receiving a resources allocation request across the network to allocate access rights of a host computer to a logical volume in said storage systems;
    a second step of converting the received resources allocation request into a setup request for network equipment that exerts control of the network or the storage systems under the control of a resources managing program, said setup request including a Media Access Control (MAC) address of the host computer or the logical volume as an Application Programming Interface (API) parameter if the resources allocation request designates a host computer or a logical volume, respectively, on an Internet Protocol (IP) network, said setup request including a World Wide Name (WWN) of the host computer or the logical volume as an API parameter if the resources allocation request designates a host computer or a logical volume, respectively, on a fiber channel, thereby providing compatibility of different modes of addressing the host computer according to the type of the network or different modes of accessing the logical volume according to the type of the storage systems; and
    a third step of allocating access rights of the host computer to the logical volume in accordance with the setup request converted from the resources allocation request.

2. A method for managing resources of storage systems on a network according to claim 1, wherein:
    said second step further comprises the steps of:
    under the control of said resources managing program, registering the following entries into a table: for each logical volume in the storage systems, its identifier on said network, its address which adapts to the type of the network, and a group identifier which is assigned by grouping said logical volume into a group; and
    allocating logical volumes making up group in a lump, according to said group identifier.

3. A method for managing resources of storage systems on a network according to claim 1, wherein:
    said second step further comprises the steps of:
    registering identification and related information for host computers on the network; mapping a host computer or a group of host computers with a group identifier to a logical volume or a group of or logical volumes in the storage systems; and
    setting the host computer or the group of host computers permitted to access the logical volume or the group of or logical volumes the storage systems according to said mapping step.

4. A method for managing resources of storage systems on a network according to claim 1, wherein:
    said second step further comprises the step of:
    setting information of the access rights of each host computer to the logical volumes in the storage systems on said network equipment or said storage systems, wherein said information is used by said resources managing program as management information.

5. A method for managing resources of storage systems on a network according to claim 4, wherein:
    said second step further comprises the steps of:
    comparing the information of the access rights of each host computer the logical volumes in the storage systems, set on said storage systems or said network equipment, with the management information held by said resources managing program; and
    changing any discrepancy resulting from said comparing step, to the set access rights information in accordance with the management information held by said resources managing program.

6. A method for managing resources of storage systems on a network according to claim 4, wherein:
    said second step further comprises the steps of:
    when a program other than said resources managing program changes the information set on said storage systems or said network equipment, receiving notification of the setting change from the storage systems or the network equipment;
    comparing the setting change with the management information held by the resources managing program; and
    changing any discrepancy resulting from said comparing step, to the set access rights information in accordance with the management information held by the resources managing program.

7. A method for managing resources of storage systems on a network according to claim 1, wherein:
    said second step further comprises the steps of:
    under the control of said resources managing program, adding network interface type information to the address of each host computer to which the logical volumes in the storage systems are allocable; and
    storing the network interface type information as a part of management object information that the resources managing program holds for management;
    wherein said second step converts the received resources allocation request into a setup request adapting to the type of the interface.

8. A computer program for managing resources of storage systems on a network, said computer program comprising computer readable program code means causing a computer to perform the step of:
    converting a resources allocation request received across the network into a setup request for network equipment that exerts control of the network or the storage systems, said setup request including a Media Access Control (MAC) address of the host computer or the logical volume as an Application Programming Interface (API) parameter if the resources allocation request designates a host computer or a logical volume, respectively, on an Internet Protocol (IP) network, said setup request including a World Wide Name (WWN) of the host computer or the logical volume as an API parameter if the resources allocation request designates a host computer or a logical volume, respectively, on a fiber channel, thereby providing compatibility of different modes of addressing the host computer according to the type of the network or different modes of accessing the logical volume according to the type of the storage systems.

9. A computer program for managing resources of storage systems on a network according to claim 8, wherein:
said step further comprises the steps of:
registering the following entries into a table: for each logical volume in the storage systems, its identifier on said network, its address which adapts to the type of the network, and a group identifier which is assigned by grouping said logical volumes into a group; and
allocating making up said group in a lump, according to said group identifier.

10. A computer program for managing resources of storage systems on a network according to claim 8, wherein:
said step further comprises the steps of:
registering identification and related information for host computers on the network;
mapping a host computer or a group of host computers with a group identifier to a logical volume or a group of or logical volumes in the storage systems; and
setting the host computer or the group of host computers permitted to access the logical volume or the group of logical volumes of the storage systems according to said mapping step.

11. A computer program for managing resources of storage systems on a network according to claim 8, wherein:
said step further comprises the step of:
setting information of the access rights of each host computer to the logical volumes in the storage systems on said network equipment or said storage systems, wherein said information is used by said computer program as management information.

12. A computer program for managing resources of storage systems on a network according to claim 11, wherein:
said step further comprises the steps of:
comparing the information of the access rights of each host computer to the logical volumes in the storage systems, set on said storage systems or said network equipment, with the management information held by said computer program; and
changing any discrepancy resulting from said comparing step, to the set access rights information in accordance with the management information held by said computer program.

13. A computer program for managing resources of storage systems on a network according to claim 11, wherein:
said step further comprises the steps of:
when another program changes the information set on said storage systems or said network equipment, receiving notification of the setting change from the storage systems or the network equipment;
comparing the setting change with the management information held by said computer program; and
changing any discrepancy resulting from said comparing step, to the set access rights information in accordance with the management information held by said computer program.

14. A computer program for managing resources of storage systems on a network according to claim 8, wherein:
said computer program is stored into a dedicated hardware chip or a nonvolatile memory as firmware included in said storage systems or said network equipment.

15. A computer readable medium having a computer program for managing resources of storage systems on a network stored thereon, said computer program comprising computer readable program code means causing a computer to perform the step of:
converting a resources allocation request received across the network into a setup request for network equipment that exerts control of the network or the storage systems, said setup request including a Media Access Control (MAC) address of the host computer or the logical volume as an Application Programming Interface (API) parameter if the resources allocation request designates a host computer or a logical volume, respectively, on an Internet Protocol (IP) network, said setup request including a World Wide Name (WWN) of the host computer or the logical volume as an API parameter if the resources allocation request designates a host computer or a logical volume, respectively, on a fiber channel, thereby providing compatibility of different modes of addressing the host computer according to the type of the network or different modes of accessing the logical volume according to the type of the storage systems.

16. An apparatus for managing storage resources on a network, said apparatus comprising:
means for receiving a resources allocation request across the network;
means for converting the received resources allocation request into a setup request for network equipment that exerts control of the network or the storage entity under the control of a resources managing program, said setup request, including a Media Access Control (MAC) address of the host computer or the logical volume as an Application Programming Interface (API) parameter if the resources allocation request designates a host computer or a logical volume, respectively, on an Internet Protocol (IP) network, said setup request including a World Wide Name (WWN) of the host computer or the logical volume as an API parameter if the resources allocation request designates a host computer or a logical volume, respectively, on a fiber channel, thereby providing compatibility of different modes of addressing the host computer according to the type of the network or different modes of accessing the logical volume according to the type of the storage entity; and
means for sending said setup request to said network equipment or said storage entity across the network.

* * * * *